(12) United States Patent
Borgen (10) Patent No.: US 7,296,971 B2
(45) Date of Patent: Nov. 20, 2007

(54) WIND POWER STATION

(75) Inventor: Eystein Borgen, Hundvåg (NO)

(73) Assignee: Sway AS, Ostervag (NO)

( * ) Notice: Subject to any disclaimer, the term of this patent is extended or adjusted under 35 U.S.C. 154(b) by 4 days.

(21) Appl. No.: 10/554,279

(22) PCT Filed: Apr. 28, 2004

(86) PCT No.: PCT/NO2004/000119

§ 371 (c)(1),
(2), (4) Date: Nov. 24, 2005

(87) PCT Pub. No.: WO2004/097217

PCT Pub. Date: Nov. 11, 2004

(65) Prior Publication Data

US 2006/0269396 A1    Nov. 30, 2006

(30) Foreign Application Priority Data

Apr. 28, 2003   (NO) .................................. 20031888

(51) Int. Cl.
  *F03D 11/04*   (2006.01)
  *F03D 1/00*    (2006.01)
(52) U.S. Cl. .................................. 416/85; 416/224 R
(58) Field of Classification Search ................ 416/84, 416/85, 244 R, 246, 244 A; 290/43, 44, 290/54, 55; 405/224, 223, 202, 196, 195.1
See application file for complete search history.

(56) References Cited

U.S. PATENT DOCUMENTS 3,766,582 A * 10/1973 Lloyd et al. ................ 405/202
3,988,592 A   10/1976 Porter
5,062,765 A   11/1991 McConachy
2003/0151260 A1* 8/2003 Siegfriedsen ................ 290/44

FOREIGN PATENT DOCUMENTS

| DE | 19744174   | 4/1999  |
|----|------------|---------|
| GB | 780381     | 7/1957  |
| JP | 2002097651 | 4/2002  |
| SE | 430182     | 10/1983 |
| SU | 1281741    | 1/1987  |
| WO | WO 02052150 | 7/2002 |
| WO | WO 03004869 | 1/2003 |
| WO | WO 03098038 | 11/2003 |

* cited by examiner

*Primary Examiner*—Edward K. Look
*Assistant Examiner*—Dwayne J White
(74) *Attorney, Agent, or Firm*—Christian D. Abel (57) ABSTRACT

An arrangement for a floating wind power station (1) tower (3) which floats in a substantially vertical position in that the effective centre of gravity of the tower (3) is below the centre of buoyancy of the tower (3), and wherein a machine house (13) including rotor (15) is non-rotatably connected to the tower (3) and the tower (3) is articulatedly connected to the seabed (5), wherein the tower (3) is rotatable about a tower axis of rotation (29) in that lower part (21) of the tower (3) is provided with a swivel joint (27a or 27b) that is designed to essentially absorb vertical tensile forces.

12 Claims, 5 Drawing Sheets

WIND POWER STATION

The present invention relates to arrangements for a floating wind power station wherein the machine house is non-rotationally connected to the tower of the wind power station and the tower is rotatable about a tower rotational axis. Furthermore the tower is provided at least one tension rod and at least one outrigger where the at least one tension rod extends from an upper part of the tower, via the at least one outrigger, to a lower part of the tower.

The effective centre of gravity of the tower is below its centre of buoyancy in that the tower is anchored to the seabed, directly or via tension legs. The effective centre of gravity of the wind power station at any given time is determined by the total weight and shape of the power station and the effect of weight, shape and any tensile forces from the anchoring system. This means that the position of the effective centre of gravity can be maintained by various combinations of ballast and tension from the anchoring system, i.e., that a reduced ballast can be offset by increased tensile force from the anchoring system.

The invention also relates to an almost vertical swivel joint/rotary joint that connects the tower to a torsion-proof foundation, where the direction of the axis of rotation can deviate slightly from the perpendicular through the axis that passes through a rotor. A rotor housing is connected in a torsion-proof manner to an upper part of the tower. The axial direction of the swivel joint ensures that the wind forces against the rotor apply a torque to the tower which maintains the rotor in a favourable position relative to the wind direction at all times. As a result of this effect, the design of the tower can be optimised, in that the maximum bending stress occurs in a plane that coincides with the centre axis through the tower and the centre axis through the rotor.

In the case of vertically floating wind power station towers which float in that the effective centre of gravity is below the centre of buoyancy of the tower, the tower being anchored to the seabed, directly or via tension legs, the tower will be subjected to large bending moments. To obtain sufficient stability, a tower of this kind will be roughly twice as high as a similar conventional tower located on land.

The bending moments occur both because of the effect of the waves on the structure and because of the force of the wind against the wind power generator rotor at the top of the tower. When the tower leans because of the wind force, the effect of the vertically upward directed buoyancy force will act as a flexible support for the tower in the whole area from the water surface down to where the tower has positive buoyancy. Therefore, the effective lever arm will be longer than in the case of a similar tower which has its foundation on land and hence a shorter total tower length. In addition, the bending moments in the tower will also often be greater than for corresponding towers on land if an attempt is made to utilise the higher average wind speed found at sea.

Because the tower leans when subjected to the wind forces, it will be desirable to set the rotor at an angle other than 90 degrees to the tower to ensure that the axis of the rotor remains approximately horizontal. This means that the rotor blades could strike against the tower if the rotor is positioned on the windward side of the tower, It will therefore be desirable to be able to position the rotor on the leeward side of the tower. However, this causes the disadvantage that the rotor blades pass through the shadow area behind the tower each time a blade passes the 6 o'clock position, which results in a sudden change of the wind pressure against the blades and thus substantial fatigue stress.

If the axis of the rotor is positioned on the tower at angle other than 90 degrees to the tower, as described above, the torque from the rotor, which is converted into energy in the wind power station generator, will also be partly transferred as a torque down through the tower. This will cause the wind power station to have a tendency to turn away from the wind if it is not non-rotationally secured to the seabed. If the wind power station is held in place in a non-rotational manner, the more or less constant torque will have to be handled by the directional motors or brakes of the wind power station mounted between the machine house and the tower.

The object of the invention is to remedy the disadvantages of the prior art.

This object is achieved by the features that are disclosed in the description below and in the following claims.

The invention is based on moving one of the floating wind power station's arrangements for maintaining direction relative to wind, as described above, from an upper part of the wind power station tower to its lower part. A tower's swivel joint with an essentially vertical centre axis, and essentially coincident with the perpendicular to a centre axis through a wind power station rotor, is mounted on the lower part of the tower. A machine house containing wind power station rotor, gear housing and generator, or transfer transmission to the gear housing and the generator located lower down on the tower, is non-rotationally connected to the wind power station tower.

The lower part of the tower is connected to the seabed, or to a tension leg anchored to the seabed, hereinafter called the anchor system. The connection between the tower and the anchor system consists of a freely bendable, torsion-proof joint (universal joint) according to prior art per se.

In what follows
a) a centre axis through the rotor of a wind power station is called the rotor axis of rotation; and
b) a centre axis through the swivel joint of the wind power station is called the tower axis of rotation.

The said position of the turning devices of the wind power station means that the wind will always come from the same side of the tower, in that the whole tower is turned into the wind together with the machine house and rotor. This has an effect on how the tower can be built, as the tower is subjected to the greatest stress from a clearly defined direction.

If the resulting point of application of forces applied to the tower by ocean currents and waves is in the tower axis of rotation, the tower will not be turned by the forces from ocean currents and wind. For a tower with a circular cross-section and rectilinear centre axis, it is thus advantageous that the tower axis of rotation and the centre axis of the tower should be coincident to prevent the tower from being made to turn by ocean currents and waves.

The torque of the rotor is transferred to a generator. How this affects the stability of the tower depends on the direction of the rotor axis of rotation relative to the tower axis of rotation. There are two different situations:
a) The rotor axis of rotation is at right angle to the tower axis of rotation:
   The torque is transferred to the tower as bending moment;
b) The rotor axis of rotation is not at right angles to the tower axis of rotation:
   The torque is transferred to the tower partly as bending moment, and partly as torque about the tower axis of rotation.

The tower is also affected by the wind forces against the rotor blades, as the total wind force against the blades will apply a torque to the tower about the tower axis of rotation if the common point of application of the forces is not coincident with the tower axis of rotation. If said point of application is in front of the tower axis of rotation when seen in the wind direction, the wind forces will try to turn the tower so that the rotor is positioned on the opposite side, that is, on the leeward side of the tower.

Consequently, the direction of the tower axis of rotation is used to control how the tower and its rotor are to be oriented relative to the wind. Thus, the fact that the tower turns constantly with the wind means that a major advantage is obtained as regards material consumption, weight and the cost of building a floating wind power station tower.

The most important design factor for a wind power station tower is in fact the bending stress in the wind direction caused by the wind pressure against the rotor, machine house and tower. For an ordinary tower with a rotating machine house, the tower must be dimensioned for wind pressure from all directions. The use of a tower which turns with the wind will allow the tower to be built to absorb the greatest forces in just one direction.

If the tower axis of rotation intersects the rotor axis of rotation in front of the rotor, that is to say, in front of the centre of the point of application of the wind forces on the rotor, when seen in the direction of the rotor, and where the machine house and tower are behind the rotor, the tower will be kept turned into the wind with the rotor on the windward side of the tower.

If the tower axis of rotation intersects the rotor axis of rotation behind the rotor, that is to say, behind the centre of the point of application of the wind forces on the rotor, when seen in the direction of the rotor, and where the machine house and the tower are behind the rotor, the tower will be kept turned with the wind, so that the rotor is on the leeward side of the tower.

When the intersection of the said axes of rotation is close to the rotor, the rotational stability of the tower will be small. The rotational stability increases as the distance between said intersection and rotor increases.

It is desirable to keep the rotor axis of rotation essentially horizontal during is operation. Because of the wind forces against the tower, the tower will lean in the wind direction. It is also desirable to maintain a certain distance between the tower and the outer ends of the rotor blades to prevent the blades from striking against the tower in strong wind. One consequence of the two said factors is that it is advantageous to keep the rotor on the leeward side of the tower. The tower axis of rotation is thus advantageously positioned so that the tower axis of rotation intersects the rotor axis of rotation behind the rotor, when seen in the direction of the rotor with the machine house and tower behind the rotor.

The windward side of the tower is provided with bracing/rods suitable for absorbing the bending stresses which are primarily exerted in a plane coincident with the wind direction and/or the wave direction. The bracing/rods can be made by connecting one or more tension rods from the upper part of the tower to the lower part of the tower via one or more outriggers preferably in the vicinity of the central part of the tower, or at a part where the bending moments of the tower are greatest.

The upper part of the tower advantageously has an aerodynamic profile to prevent or minimise turbulence on the leeward side of the tower. Thus, the disadvantages are minimised in that the rotor blades are subjected to reduced wind pressure each time they pass the leeward side of the tower. In this way the danger of fatigue stress is reduced, as the load variations on the blades are minimised.

If the wind direction changes over a short period of time without the tower being turned with it fast enough, the wind may exert substantial transverse forces on the tower and create turbulence behind the tower. To counteract this, the rear edge of the aerodynamic profile can be made flexible or the whole profile can be mounted on the tower so that it is allowed to turn to a certain degree with the wind without the tower being turned. Thus, the wind forces themselves will ensure that the aerodynamic profile always is always in the wind direction. Optionally the profile may be provided with damping so that its adaptation to the changed wind direction is smoother.

As the swivel joint of the tower is mounted close to the universal joint, the bending moment on the swivel joint is almost zero. Thus, the swivel joint can be made smaller and less expensive than a conventional swivel system located by the machine house on top of the tower. A conventional swivel system must be dimensioned for relatively large bending stresses from the rotor of the wind power station.

The swivel joint could be mounted coincident with the centre axis of the tower. The wind power station will then take up a position with the rotor on its leeward side, in the same way as a weathercock. Because of the tilt of the tower caused by the wind forces, a tilt which will typically be about 5-20 degrees static, and the desire to maintain the rotor axial direction essentially horizontal during operation, the rotor will typically be mounted at a static angle of 90 degrees+5-20 degrees=95-110 degrees between the rotor axis of rotation and the tower axis of rotation.

As the rotor axis of rotation is not at right angles to the tower axis of rotation, the torque that is transferred from the rotor through the generator will apply a torque to the tower around the tower axis of rotation. This is unfavourable as it means that the rotor has a tendency to be turned away from the wind direction. Because the swivel joint essentially does not absorb bending moment, the tower axis of rotation can be set at right angles to the rotor axis of rotation, that is to say, "askew" relative to the centre axis of the tower and at the same number of degrees as the 5-20 degrees mentioned above. Thus, the tower will no longer have a tendency to turn the rotor axis away from the wind direction.

The wind power station cables for the transmission of electric power run from the generator through the tower and down to the seabed. To minimise the twisting of the cable when the wind power station is turned with the wind through one or more revolutions in the same direction, it is an advantage that the cable should run along the centre through the tower's swivel device and universal joint at the bottom of the tower. The universal joint is therefore advantageously provided with an open centre according to prior art per se.

To prevent the cable connection through the swivel joint from being twisted as a result of the tower turning several times with the change of direction of the wind, the swivel joint is appropriately provided with devices for forced rotation of the tower back to a position that is neutral for the cables. The devices for forced rotation are advantageously combined with devices for preventing any locking of the turning function, for example by using one or more hydraulically operated motors.

Below follows a description of a non-limiting example of a preferred embodiment that is illustrated in the attached drawings, wherein

FIG. 2a is a side view, on the same scale as FIG. 1, of a floating power station, where a tower axis of rotation is at right angles to a rotor axis of rotation and where the tower is stabilised by means of stays and provided with aerodynamic covers;

FIG. 2b shows on a larger scale a cross-section taken along the line II-II through the tower in FIG. 2a;

Figure 1:
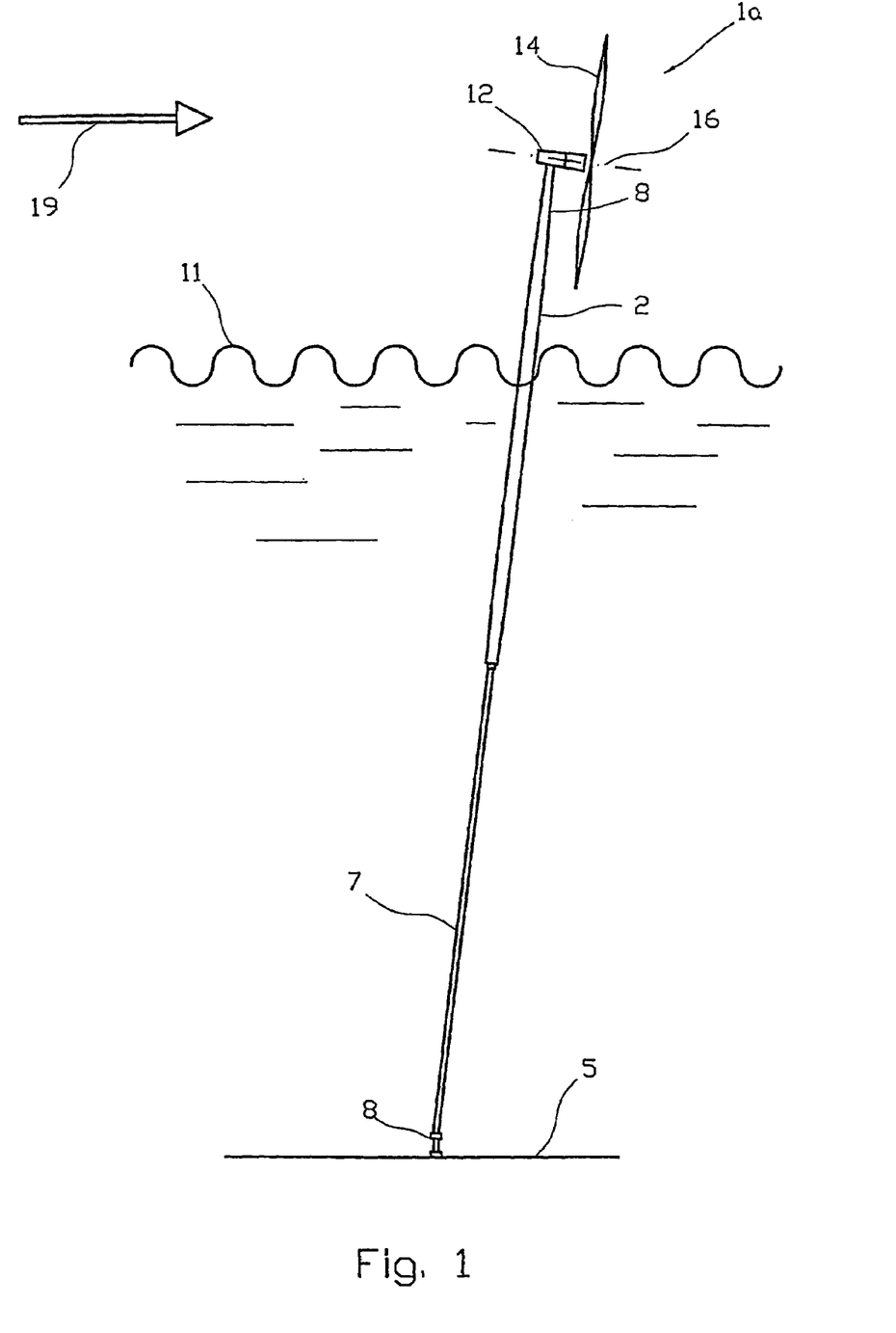
FIG. 1 is a side view of a floating wind power station with a tower non-rotationally anchored via a tension leg and with a machine house pivotally connected to the tower.

Reference is first made to FIG. 1 where the reference numeral 1a indicates a floating wind power station wherein a tower 2 is non-rotationally anchored to the seabed 5 by means of a tensioned anchor leg 7 and an anchor 8, and wherein an upper part 8 of the tower 2 projects above the surface of the sea 11. A machine house 12 is pivotally connected to the upper part 8 of the tower 2. A rotor 14 has a rotor axis of rotation 16 at right angles to the centre axis of the tower 2. An arrow 19 marks the direction of the wind towards the wind power station.

Figures 2A, 2B:
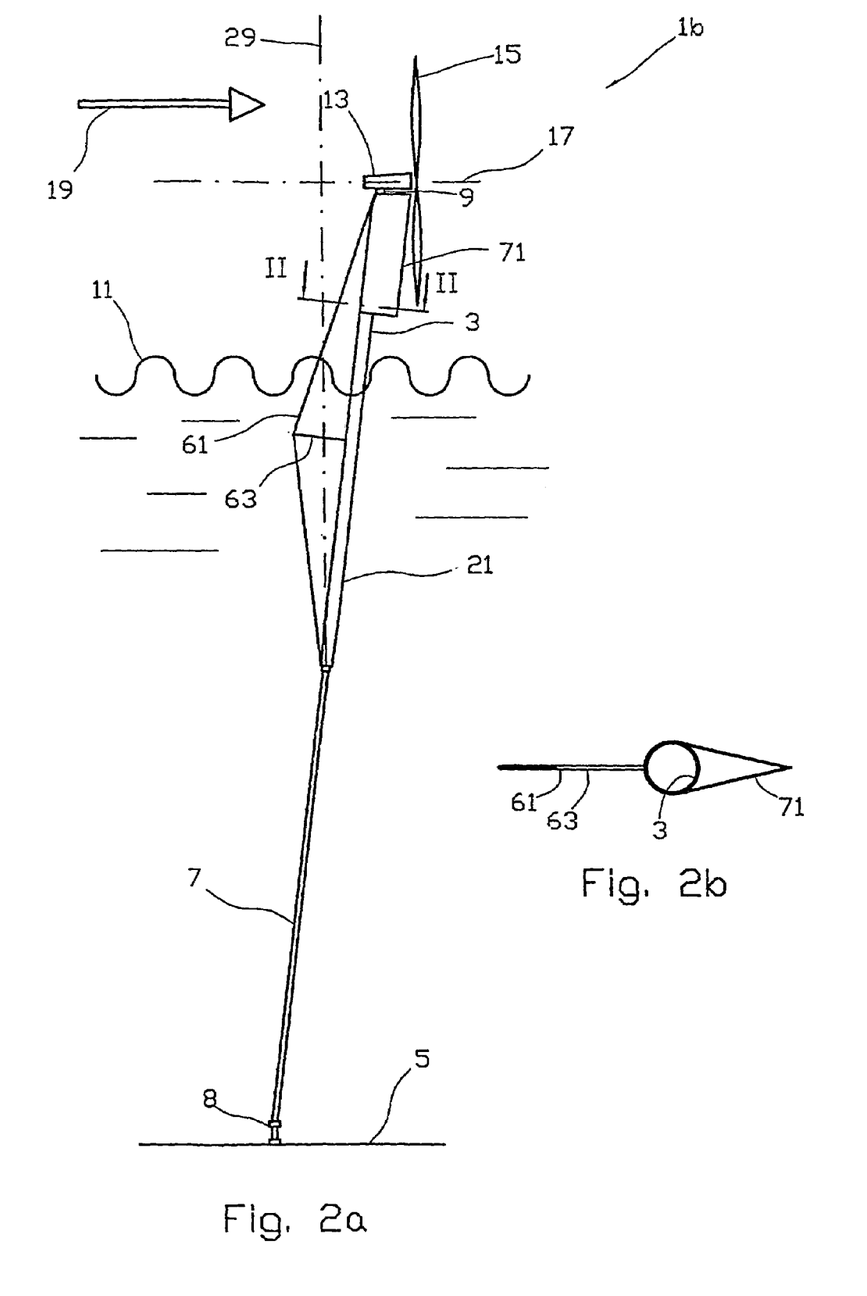
Figure 2C:
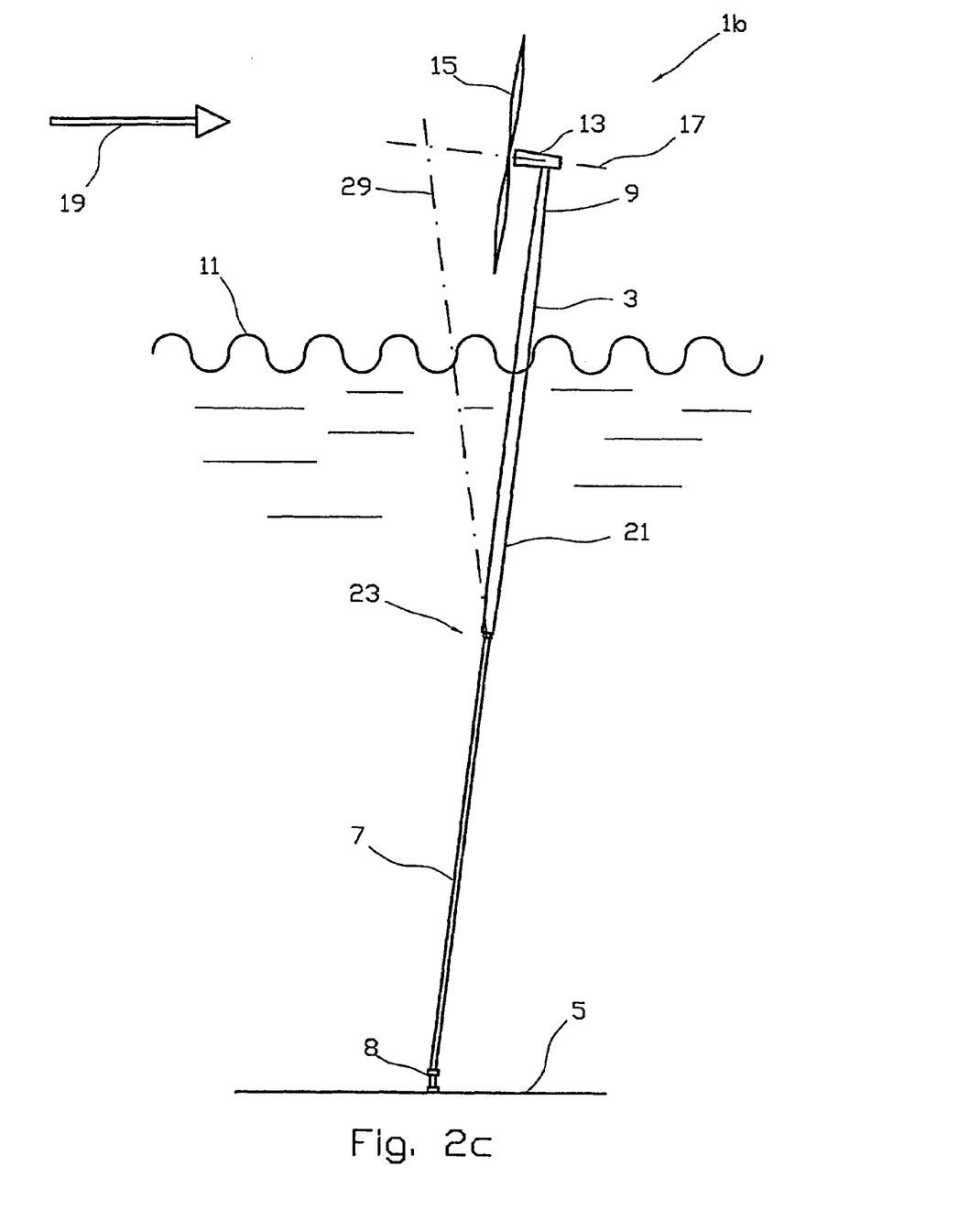
FIG. 2c is a side view, on the same scale as FIG. 1, of a floating wind power station, where the tower axis of rotation is at an angle to the wind direction.
Figure 3:
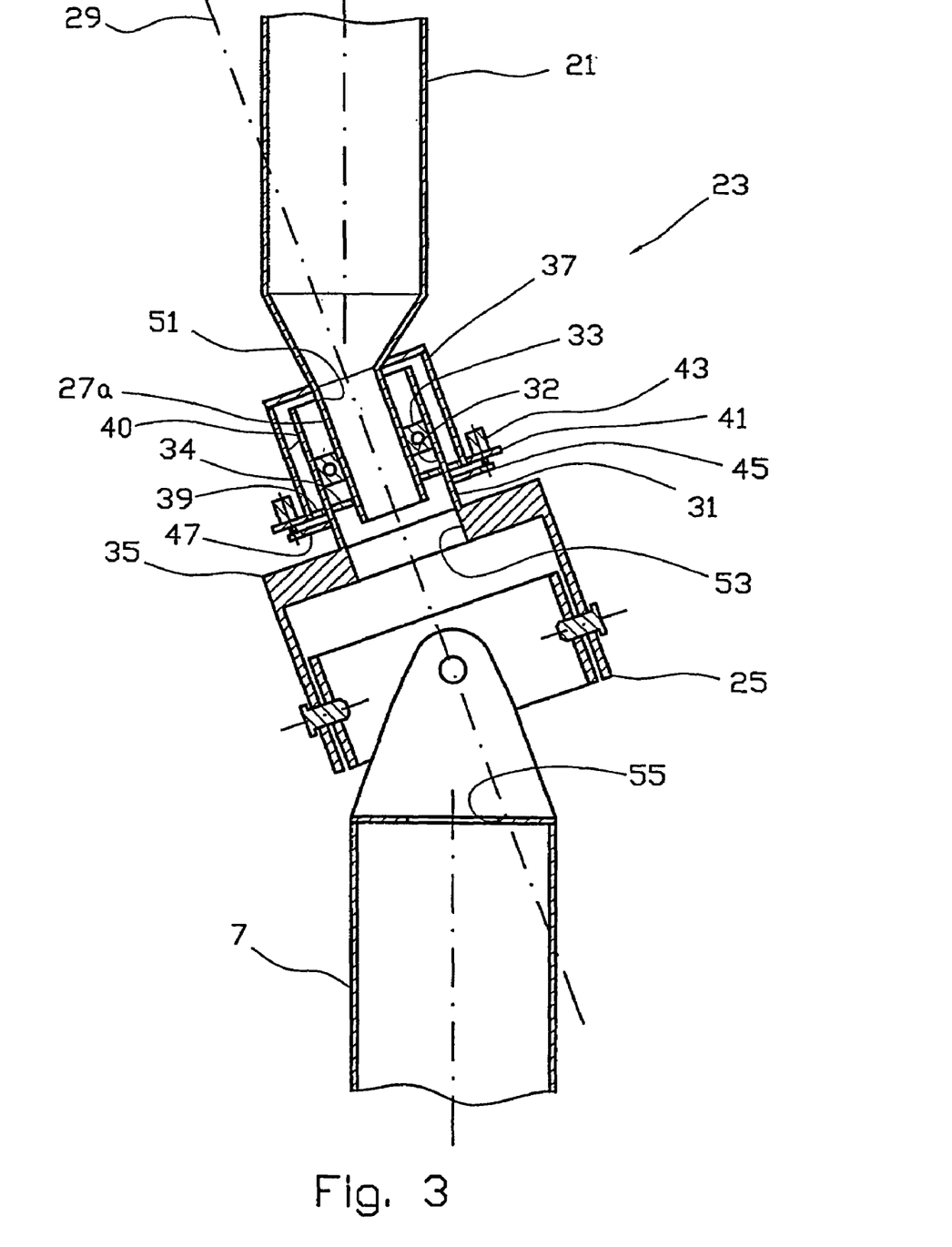
FIG. 3 shows on a larger scale a longitudinal section through a connection between a tower with an inclined swivel joint, a freely bendable universal joint and a tensioned anchor leg.

Reference is next made to FIGS. 2a-3, wherein the reference numeral 1b indicates a floating wind power station according to the invention wherein a tower 3 is anchored to the seabed 5 by means of the tensioned anchor leg 7 and the anchor 8, and wherein an upper part 9 of the tower 3 projects above the surface of the sea 11. A machine house 13 is non-rotationally connected to the upper part 9 of the tower 3. A rotor 15 has an axis of rotation 17 at right angles to the centre axis of the tower 3. The arrow 19 indicates the wind direction towards the wind power station.

The tower 3 is connected to the tensioned anchor leg 7 by an articulation 23.

The articulation 23 comprises a swivel joint 27a and a universal joint 25. The swivel joint 27a is attached to the lower part 21 of the tower 3 at an angle so that a tower axis of rotation 29 intersects the rotor axis of rotation 17. The swivel joint 27a is pivotally fastened to a bearing house 31 by means of a ball bearing 33 and axial locking means (not shown) on the swivel joint 27a and in the bearing housing 33. The bearing housing 31 is fixed to the upper section 35 of a universal joint 25. A seal 34 is located below the bearing 33 and seals an annular space 32 between the swivel joint 27a and the bearing housing 31.

The universal joint 25 forms a torsion-proof connection to the tension leg 7.

A casing 37 is fastened to and seals tightly around the fastening point of the swivel joint 27a to the lower part 21 of the tower 3 and essentially surrounds the bearing housing 31. A seal 39 is placed below the bearing 33 and closes an annular space 40 between the casing 37 and the bearing housing 31. The annular spaces 32 and 40 communicate via the bearing 33 and are filled with a bearing lubricant.

The casing 37 is provided with motor supports 41 and several hydraulic motors 43 which via a drive gear 45 are engaged with a rim gear 47 fastened to the bearing housing 31. The motors 43 are connected to a drive unit (not shown) and a control system (not shown).

Figure 4:
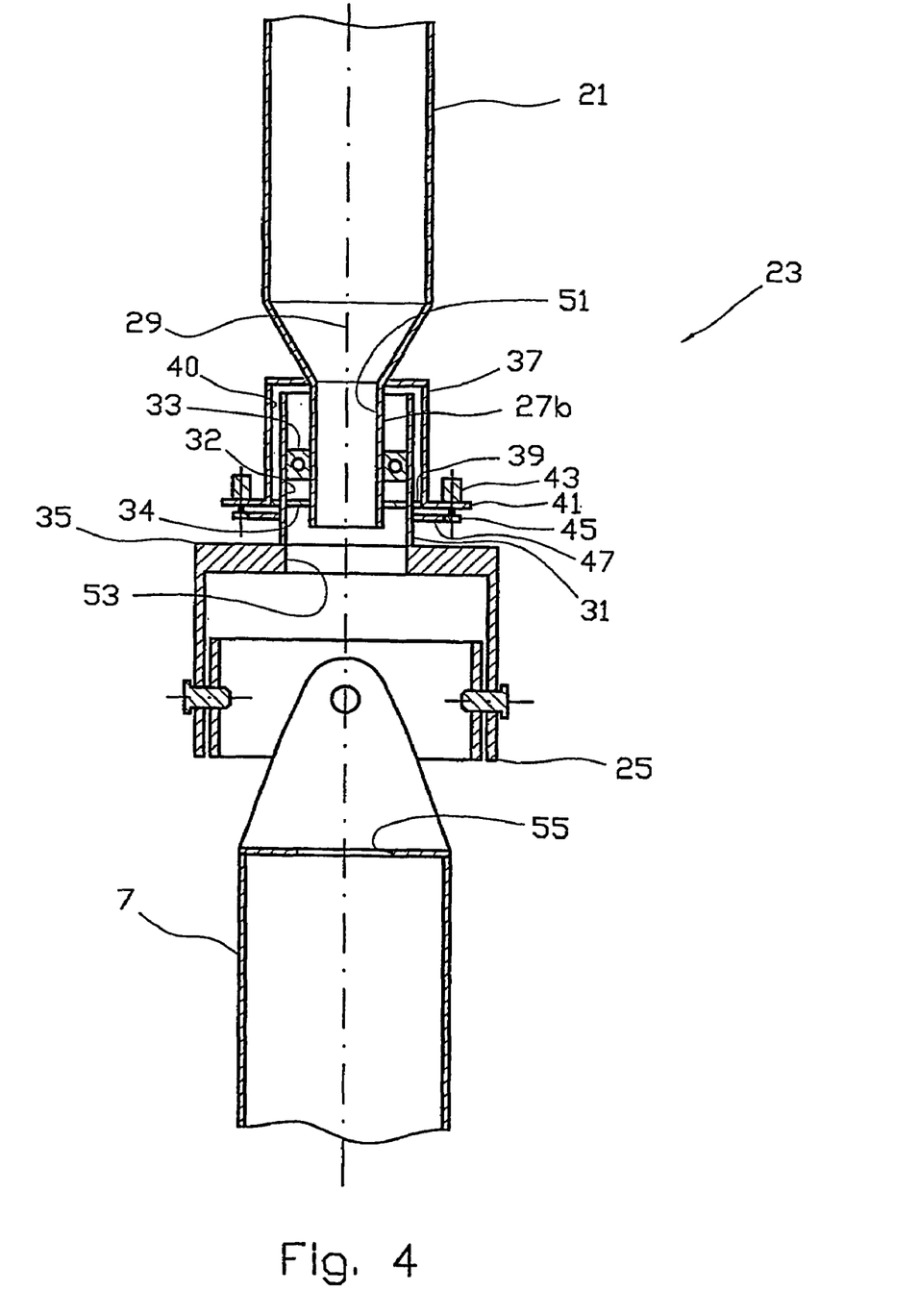
FIG. 4 shows on the same scale as FIG. 3 a longitudinal section through an alternative connection between a tower having a straight swivel joint, a freely bendable universal joint and a tensioned anchor leg.

In an alternative embodiment shown in FIG. 4 the centre axis of a swivel joint 27b, i.e., the tower axis of rotation 29 is coincident with the centre axis of the tower 3.

The swivel joint 27a, 27b has an open central passage 51. The universal joint 25 and the tension leg 7 also have open central passages 53 and 55 for running cables to the wind power station (not shown).

According to FIG. 2a, the tower 3 is provided with a tension rod 61 connected to the upper and lower parts 9, 21 of the tower 3 and held stretched out by two outriggers 63 that are fastened to the tower 3, and which in one embodiment of the invention project out from the windward side of the tower ±30 degrees relative to a plane coincident with the wind direction and/or wave direction.

The upper part 9 of the tower 3 is shaped aerodynamically, i.e., with a non-circular cross-section. The upper part 9 of the tower may be provided with aerodynamic screens 71 preferably partially rotatable about the tower 3, and may be designed to reduce the turbulence of the wind (19) on the leeward side of the tower (3).

The tower 3 floats essentially upright and is held in position by anchoring to the seabed 5 under tension of the tension leg 7.

The universal joint 25 ensures that the swivel joint 27a or 27b, does not absorb bending moment.

The swivel joint 27a or 27b and its support 31, 33 ensure that the tower 3 can turn freely about the tower axis of rotation 29 and take up a direction that corresponds to the wind direction.

By determining the direction of the tower axis of rotation 29 relative to the rotor axis of rotation 17 and the resultant point of application of the wind forces on the rotor 15, it is possible to determine how the tower will be positioned relative to the wind direction.

Setting the tower axis of rotation 29 to intersect the rotor axis of rotation 17 in front of the rotor 15, when seen with the rotor in front of the machine house 13 (as shown in FIG. 2c), will result in the wind turning the tower 3 to stand with the rotor on the windward side of the tower. This may be desirable if the intention is to use an upwind rotor 15, which is most technically and commercially available today.

Since the casing 37 seals around the junction between the swivel joint 27a or 27b and the tower 3, fewer demands may be made as regards the quality of the seals 34 and 39 if a bearing lubricant that is lighter than water is used. Because of the central opening 53 in the universal joint 25, the water pressure on the seals 34, 39 is equal, and the water pressure alone is capable of holding the bearing lubricant in place in the annular spaces 33, 40 defined by the casing 37 and the swivel joint 27a or 27b.

Since the power transmission cables (not shown) only tolerate a limited degree of twisting, the motors 43 are used, after the tower has rotated a certain number of times with the wind, to cause the tower 3 to rotate back to a position of neutrality for the cables. The motors 43 can also be used to dampen or stop the rotational motion of the tower.

The invention claimed is:

1. An arrangement for a tower of a floating wind power station comprising a machine house including a rotor, the machine house being non-rotationally connected to the tower and the tower being rotatable about a tower rotational provided with at least one tension rod and at least one outrigger, the at least one tension rod extending from an upper part of the tower, via the at least one outrigger, to a lower part of the tower.

2. An arrangement according to claim 1, wherein the tower axis of rotation is coincident with the centre axis of the tower.

3. An arrangement according to claim 1, wherein the tower axis of rotation is at an angle to the centre axis of the tower.

4. An arrangement according to claim 1, wherein an upper part of the tower is aerodynamically designed, i.e., with a non-circular cross-section, or provided with aerodynamic screens preferably partially rotatable about the tower.

5. An arrangement according to claim 1 wherein the tower is articulately connected to the seabed or to a tensioned anchor leg.

6. An arrangement according to claim 1 wherein the effective centre of gravity of the tower is below the centre of buoyancy of the tower.

7. An arrangement according to claim 1 wherein the lower part of the tower is provided with a swivel joint.

8. An arrangement according to claim 7, wherein the swivel joint is provided with means for forced rotation of the tower.

9. An arrangement according to claim 7, wherein a bearing housing for the swivel joint is connected to a tensioned anchor leg via a freely bendable joint.

10. An arrangement according to claim 9, wherein the tower its lower part, the swivel joint, the joint and the tension leg are provided with open central passages for the routing of cables.

11. An arrangement according to claim 9, wherein the bearing housing is surrounded by a casing which, together with the swivel joint and essentially downward directed seals, forms communicating annular spaces.

12. An arrangement according to claim 11, wherein the communicating annular spaces are designed to hold a lubricant enclosed by means of water pressure directed towards the essentially downward directed seals of the casing.

* * * * *

UNITED STATES PATENT AND TRADEMARK OFFICE
CERTIFICATE OF CORRECTION

| | |
|---|---|
| PATENT NO. | : 7,296,971 B2 |
| APPLICATION NO. | : 10/554279 |
| DATED | : November 20, 2007 |
| INVENTOR(S) | : Eystein Borgen |

It is certified that error appears in the above-identified patent and that said Letters Patent is hereby corrected as shown below:

In claim 1, appearing in column 6, the following phrase should be inserted between the word "rotational" on line 60, and the word "provided" on line 61:

--axis and wherein the tower is further--

Signed and Sealed this

Eighth Day of April, 2008

JON W. DUDAS
*Director of the United States Patent and Trademark Office*